United States Patent
McCrary et al.

(10) Patent No.: US 7,356,939 B1
(45) Date of Patent: Apr. 15, 2008

(54) SYSTEM AND METHOD FOR MEASURING WIND DEFLECTOR HEIGHT

(75) Inventors: Samuel R. McCrary, LaRue, OH (US); Ann Marie Fredelake, Dublin, OH (US); Stanley R. Egbert, II, Anna, OH (US); Justin R. Titus, West Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/735,990

(22) Filed: Apr. 16, 2007

(51) Int. Cl.
*G01D 21/00* (2006.01)
(52) U.S. Cl. ............... 33/600; 33/546; 33/533
(58) Field of Classification Search .............. 33/613, 33/546, 549, 626, 628, 533, 555, 832–833
See application file for complete search history.

(56) References Cited

U.S. PATENT DOCUMENTS

| | | | |
|---|---|---|---|
| 2,215,224 A | 9/1940 | MacMillan | |
| 2,464,871 A | 3/1949 | Kelleher | |
| 3,210,857 A | 10/1965 | Lill | |
| 4,090,304 A | 5/1978 | Bradley et al. | |
| 4,171,846 A | 10/1979 | Isleif et al. | |
| 4,719,704 A | 1/1988 | Hogg | |
| 4,934,754 A | 6/1990 | Cioffi | |
| 5,048,195 A * | 9/1991 | Leonov | 33/645 |
| 5,131,161 A * | 7/1992 | Drag | 33/533 |
| 5,133,135 A * | 7/1992 | Durfee, Jr. | 33/534 |
| 5,205,046 A * | 4/1993 | Barnett et al. | 33/533 |
| 5,793,285 A | 8/1998 | Wehinger | |
| 6,105,267 A | 8/2000 | Hathaway | |
| 6,299,245 B1 | 10/2001 | Thiele et al. | |
| 6,792,691 B2 * | 9/2004 | Genal et al. | 33/833 |
| 6,817,111 B1 | 11/2004 | Corrado | |
| 6,839,978 B2 * | 1/2005 | Allen | 33/642 |
| 6,991,281 B2 | 1/2006 | Spence et al. | |
| 7,069,666 B2 * | 7/2006 | Navarro et al. | 33/638 |
| 2005/0166415 A1* | 8/2005 | Kiwada et al. | 33/613 |
| 2006/0163916 A1 | 7/2006 | Escher et al. | |

* cited by examiner

*Primary Examiner*—Yaritza Guadalupe-McCall
(74) *Attorney, Agent, or Firm*—Mark E. Duell; Michael A. Forhan; Elay Law Firm Co.

(57) ABSTRACT

A system for measuring the height of a wind deflector mounted to the roof of a vehicle. A longitudinal base has a first end, an opposing second end, a generally planar top surface and a generally planar bottom surface. An adjustable stop is proximate the first end of the base and extends away from the bottom surface. A level indicator is affixed to the top surface of the base. An arm is spaced apart from the top surface of the base, and a displacement indicator is affixed to the arm. The displacement indicator displays information relating to the height of the wind deflector above the roof when the second end of the base contacts the wind deflector proximate the roof, the level indicator indicates that the base is on a level plane, and the displacement indicator is in contact with a top edge of the wind deflector.

20 Claims, 3 Drawing Sheets

SYSTEM AND METHOD FOR MEASURING WIND DEFLECTOR HEIGHT

FIELD

The present invention relates generally to wind deflectors for vehicles, in particular to a system and method to measure the height of a wind deflector with reference to the roof of the vehicle to which it is mounted.

BACKGROUND

A sunroof is a popular accessory item for a motor vehicle. The sunroof typically includes a closure panel that is movable relative to an opening formed through a roof of the vehicle. The closure panel is movable between a closed position generally flush with the roof that completely covers the opening, and an open position rearward of the closed position for allowing ventilation and/or sunlight to enter a passenger compartment of the vehicle. In addition, the closure panel is typically positionable at one of a plurality of partially open positions between the closed and open positions. The closure panel, which may be moved manually or via an electric motor, is retracted into the structure of the roof when open, where it is hidden from view.

Sunroof assemblies have a shortcoming wherein noise is transmitted into the passenger compartment when the closure panel is in an open position due to the flow of air proximate the sunroof opening. One component of the wind noise, commonly termed "buffeting" or "wind throb," results from air rushing over the opening in conjunction with a cavity formed by the passenger compartment and is generally characterized by relatively low-frequency noise. Another component of wind noise typically results from air rushing by or into obstructions such as sunroof components at higher vehicle speeds and is generally characterized by high-frequency noise.

Wind deflectors are frequently incorporated into sunroof assemblies in an effort to attenuate wind noise. The wind deflector is commonly arranged proximate the forward edge of the sunroof opening in order to control the airflow over the opening for the purpose of minimizing both wind throb and high-frequency wind noise. When a new vehicle design is undergoing development the design height of the wind deflector above the vehicle roof is typically iteratively adjusted and tested to establish a "tuned" value that represents an optimum balance of minimized wind throb and high-frequency wind noise. However, it can be difficult to obtain accurate, repeatable measurements of wind deflector height due to such factors as imprecise measurement reference points, making the tuning process laborious and subject to error. There is a need for a way to accurately and repeatably measure the height of the wind deflector above the vehicle roof.

SUMMARY

An embodiment of the present invention is an instrument for measuring the height of a wind deflector with reference to the roof of a vehicle to which it is mounted. The instrument is first adjusted so that a displacement indicator contacts a top edge of the wind deflector. A set screw extending between the instrument and the roof is adjusted using a level indicator to level the instrument. Information relating to the height of the deflector above the roof can then be read on the displacement indicator. In various embodiments instruments having different sizes and shapes can be constructed to accommodate different styles of deflectors and rooflines.

An object of the present invention is a system for measuring the height of a wind deflector mounted to the roof of a vehicle. A longitudinal base has a first end, an opposing second end, a generally planar top surface and a generally planar bottom surface. An adjustable stop is proximate the first end of the base and extends away from the bottom surface. A level indicator is affixed to the top surface of the base. An arm is spaced apart from the top surface of the base and a displacement indicator is affixed to the arm. The displacement indicator displays information relating to the height of the wind deflector above the roof when the second end of the base contacts the wind deflector proximate the roof, the level indicator indicates that the base has a level orientation and the displacement indicator is in contact with a top edge of the wind deflector.

Another object of the present invention is a method for measuring the height of a wind deflector mounted to the roof of a vehicle. The method comprises the steps of selecting a base and affixing an indicator to the base such that the indicator is spaced apart from base. An end of the base is placed in contact with the wind deflector proximate the roof such that the indicator contacts a top edge of the wind deflector. The base is also oriented to a level plane. Information relating to the height of the wind deflector above the roof may then be obtained from the indicator.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
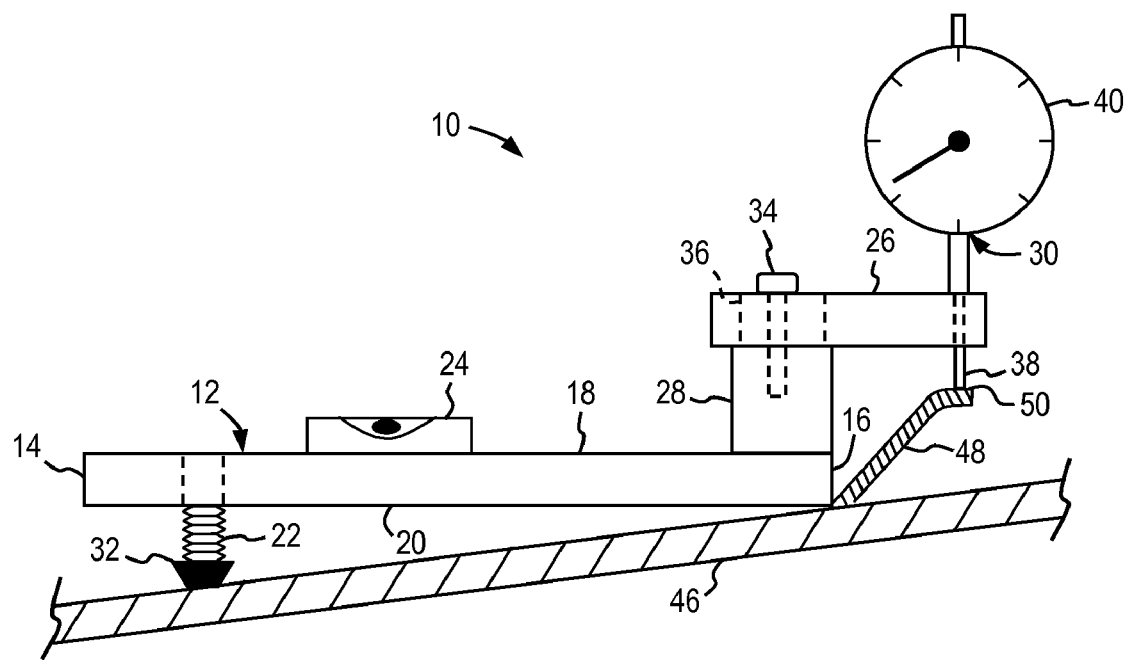
FIG. 1 is an elevational view of an instrument mounted to a vehicle roof and measuring the height of a wind deflector according to an embodiment of the present invention.
Figure 2:
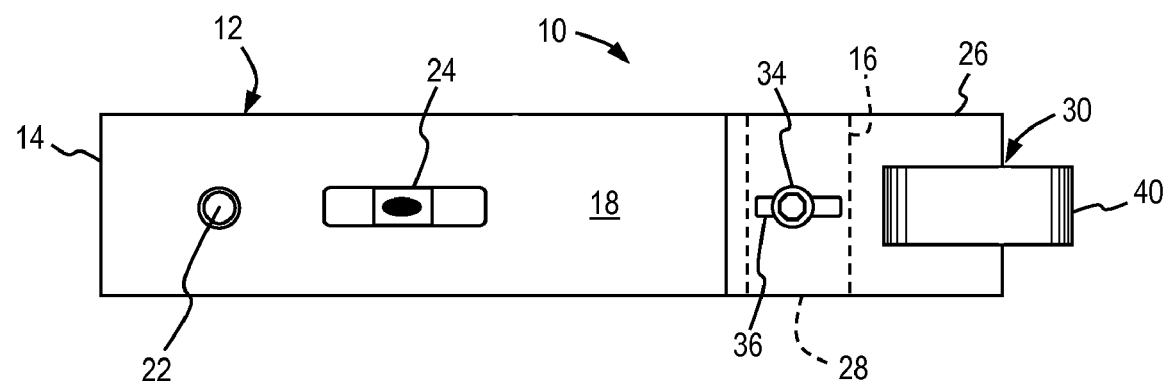
FIG. 2 is a plan view showing details of the instrument of FIG. 1.

The general arrangement of an instrument 10 for measuring the height of a wind deflector mounted to the roof of a vehicle is shown in FIGS. 1 and 2. A longitudinal base 12 has a first end 14, an opposing second end 16, a generally planar top surface 18 and a generally planar bottom surface 20. An adjustable stop 22 is affixed proximate the first end 14 of the base and extends away from the bottom surface 20. A level indicator 24 is affixed to top surface 18 of the base 12. An arm 26 is spaced apart from the top surface 18 of base 12 by a standoff 28. A displacement indicator 30 is affixed to arm 26.

Base 12 may be made from any suitable material compatible with other components of instrument 10 and the expected environment. Example materials include, without limitation, wood, metals such as steel and aluminum, plastics, and composites. Base 12 may be fabricated using any conventional process such as, without limitation, molding, stamping, casting and machining. In addition, base 12 may be finished by such processes as painting, plating and coating, or left unfinished.

Adjustable stop 22 may be any type of device configured to adjustably extend away from bottom surface 20 of base 12. Examples include, without limitation, threaded devices such as a set screw coupled to mating threads in the base. Adjustable stop 22 may further include a bumper 32 made of plastic or a resilient material such as rubber or silicone to prevent marring of the finish of a roof 46 and/or resist slippage and skidding of instrument 10. Alternate materials that may be selected for bumper 32 include, without limitation, wood and composites.

Level indicator 26 may be any type of conventional device configured to indicate the orientation of base 12. Non-limiting examples include spirit levels, inclinometers, and mechanical and electronic angle indicators.

Arm 26 may be formed integrally with standoff 28 or may be made as a separate piece and attached thereto in any conventional manner such as, without limitation, welding, adhesive and fasteners, such as threaded screws. In one embodiment of the present invention arm 26 may be releasably secured to standoff 28 with at least one fastener, such as a threaded fastener 34 inserted through the arm and coupled to mating threads in the standoff. In some embodiments arm 26 may include a slot 36 to allow for adjustment of the arm with respect to the longitudinal axis of base 12. Arm 26 may be made from any suitable material compatible with other components of instrument 10 and the expected environment. Example materials include, without limitation, wood, metals such as steel and aluminum, plastics, and composites. Arm 26 may be fabricated using any conventional process such as, without limitation, molding, stamping, casting and machining. In addition, arm 26 may be finished by such processes as painting, plating and coating, or left unfinished.

Standoff 28 separates base 12 and arm 26. Standoff 28 may be any suitable shape, such as generally rectangular, and may be formed integrally with base 12 or may be made as a separate piece. If formed separately standoff 28 may be attached to base 12 in any conventional manner such as, without limitation, welding, adhesive and fasteners such as threaded screws. Standoff 28 may be made from any suitable material compatible with other components of instrument 10 and the expected environment. Example materials include, without limitation, wood, metals such as steel and aluminum, plastics, and composites. Standoff 28 may be fabricated using any conventional process such as, without limitation, molding, stamping, casting and machining. In addition, standoff 28 may be finished by such processes as painting, plating and coating, or left unfinished.

Figure 5:
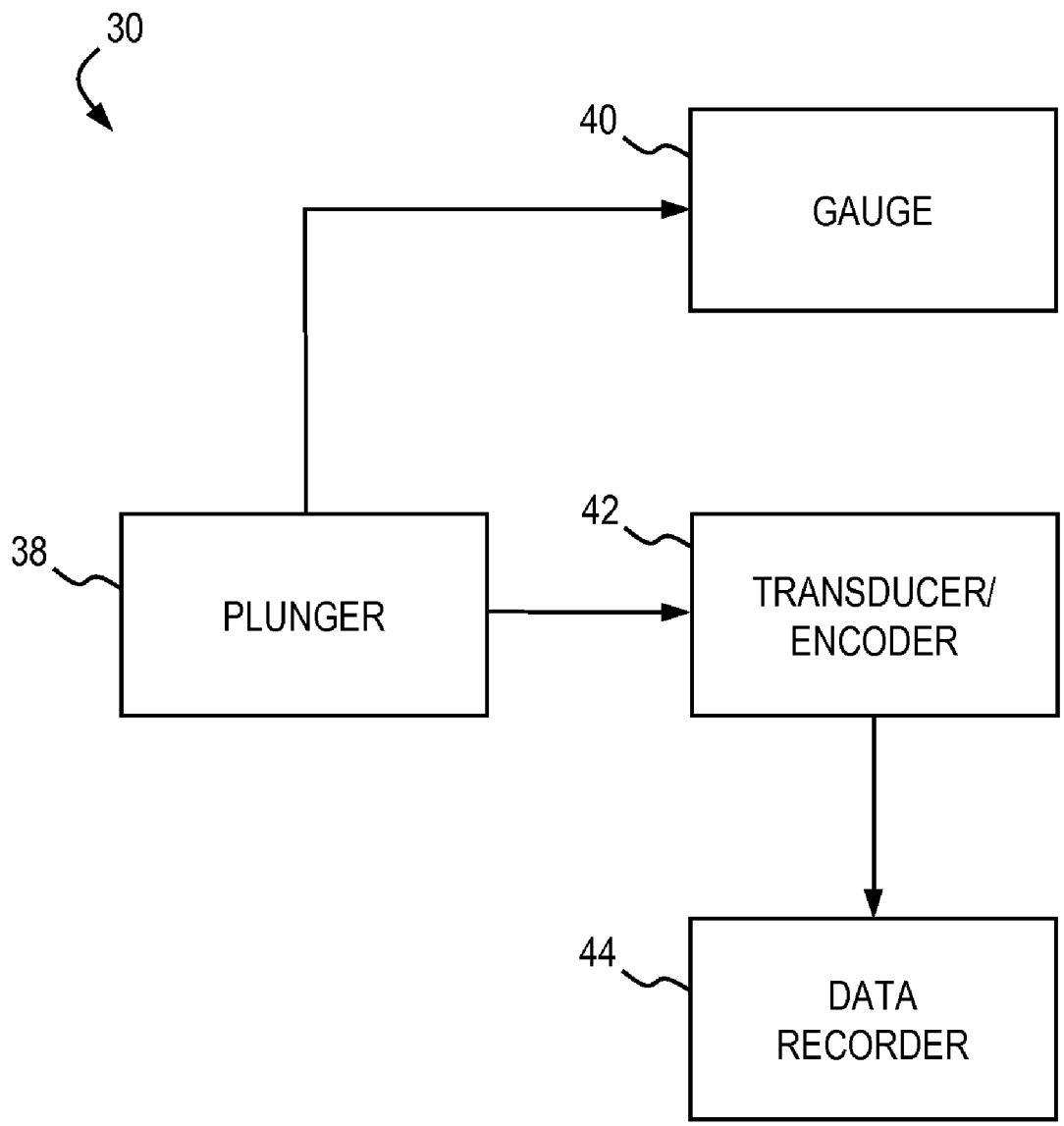
FIG. 5 is a block diagram of a displacement indicator according to an embodiment of the present invention.

Displacement indicator 30 is affixed atop arm 26 such that a plunger 38 of the indicator extends downwardly therethrough, as shown in FIG. 1. Displacement indicator 30 may be any type of conventional displacement indicator such as, without limitation, a depth gauge micrometer and a dial indicator. A gauge 40 of displacement indicator 30 provides a visually perceivable, quantified indication of the displacement of plunger 38 from its fully-extended position. Gauge 40 may provide an analog or digital visual display of the amount of displacement. As shown in FIG. 5, in some embodiments of the present invention displacement indicator 30 may include a conventional transducer or encoder 42 to convert displacement information relating to plunger 38 to a corresponding electrical signal. In some embodiments of the present invention displacement indicator 30 may further include a data recording device 44, such as a conventional local or remote data logger, to receive an electrical signal from transducer or encoder 42 and record the displacement information for later review.

With reference to FIGS. 1-4 together, in operation of instrument 10 a distance D1 (FIG. 4) is measured, D1 being the distance between bottom surface 20 of base 12 and the tip of plunger 38 in its fully-extended position. Gauge 40 of displacement indicator 30 is then zeroed or calibrated to a known value with plunger 38 fully extended. Instrument 10 is then mounted to a roof 46 of a vehicle (FIG. 3) such that second end 16 of the instrument is in contact with a wind deflector 48 and is proximate the roof (FIG. 1). The tip of plunger 38 is positioned to contact a top edge 50 of the wind deflector (FIG. 1). Adjustable stop 22 is adjusted inwardly or outwardly from bottom surface 20 until level indicator 24 indicates that top surface 18 of instrument 10 is in a level orientation. A displacement D2 (FIG. 4) is read from gauge 40, D2 being a measure of the upward displacement of plunger 38 from its fully-extended position. The height H of wind deflector 48 above roof 46 may then be computed using Equation 1:

$$H = D1 + D2 \qquad \text{Equation 1}$$

where D1, D2 and H are common scalar units.

With continued reference to FIGS. 1-4, in some embodiments of the present invention gauge 40 may be calibrated to indicate distance D1 (FIG. 4) with plunger 38 in its fully-extended position. Accordingly, when instrument 10 is operated in the manner detailed above, gauge 40 will directly read the height H of wind deflector 44 above roof 46 when plunger 38 is placed into contact with top edge 46 of the wind deflector and moves to displacement D2.

Figure 3:
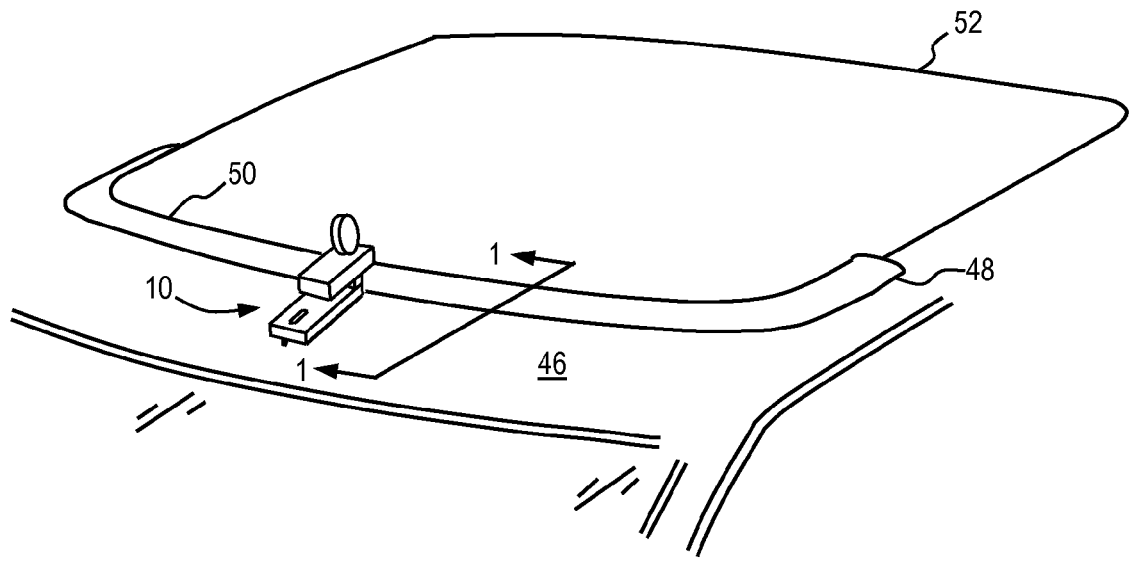
FIG. 3 shows the instrument of FIG. 1 mounted to the roof of a vehicle according to an embodiment of the present invention.
Figure 4:
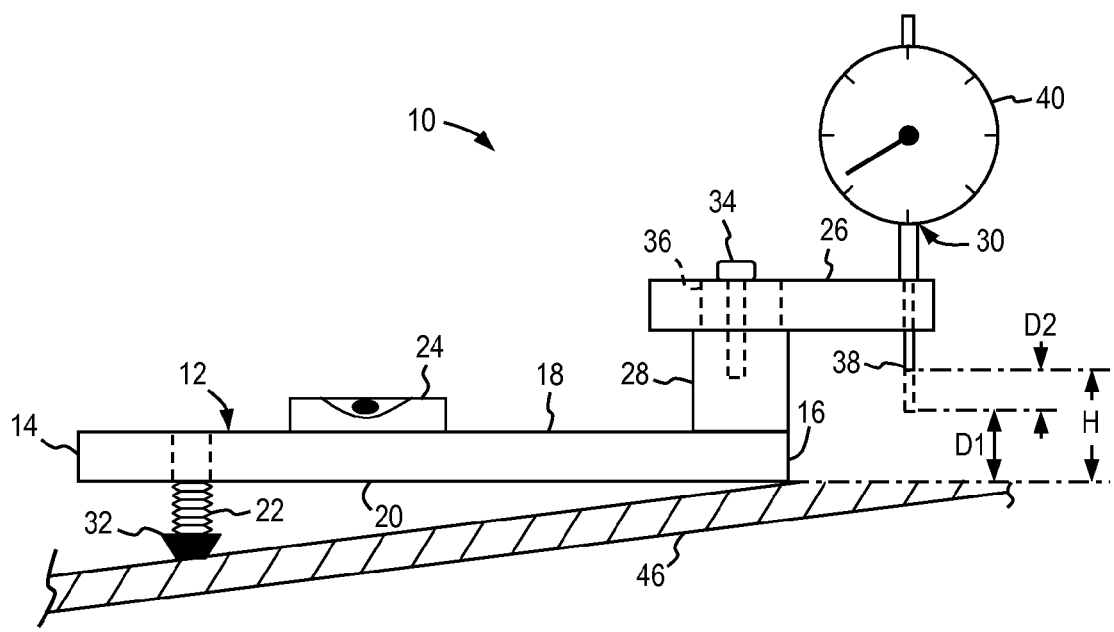
FIG. 4 details the operation of the instrument of FIG. 1 according to an embodiment of the present invention.

The wind deflector 48 of the foregoing discussion is shown in FIGS. 1 and 3 as a fixed wind deflector mounted to roof 46 of a vehicle for purposes of illustration. However, instrument 10 is equally usable for measuring "pop-up" wind deflectors mounted to the roof of a vehicle and configured to retract into a sunroof opening 52 (FIG. 4) of the vehicle when a closure panel of the sunroof is in a closed position. An example of this type of wind deflector may be seen in U.S. Pat. No. 6,666,503, hereby incorporated in its entirety by reference thereto. For these types of wind deflectors instrument 10 is used in the same manner as previously discussed. With general reference again to FIG. 1, instrument 10 is mounted to roof 46 of a vehicle such that second end 16 of the instrument is in contact with an extended pop-up wind deflector (shown generally by deflector 48) and is proximate the roof. The tip of plunger 38 is positioned to contact a top edge of the pop-up wind deflector (shown generally by top edge 50). Adjustable stop 22 is adjusted inwardly or outwardly from bottom surface 20 until level indicator 24 indicates that top surface 18 of instrument 10 is in a level orientation. Displacement D2 is then read from gauge 40. Computing H using Equation 1 will provide the height that the pop-up wind deflector projects above the roof 46 when in an extended position.

While this invention has been shown and described with respect to a detailed embodiment thereof, it will be understood by those skilled in the art that changes in form and detail thereof may be made without departing from the scope of the claims of the invention. For example, instruments having different sizes and shapes can be constructed to accommodate different styles and shapes of wind deflectors and rooflines.

What is claimed is:

1. A system for measuring the height of a wind deflector mounted to the roof of a vehicle, comprising:
    a longitudinal base having a first end, an opposing second end, a generally planar top surface and a generally planar bottom surface;
    an adjustable stop proximate the first end of the base and extending away from the bottom surface;
    a level indicator affixed to the top surface of the base;
    an arm spaced apart from the top surface of the base; and
    a displacement indicator affixed to the arm,
    wherein the displacement indicator displays information relating to the height of the wind deflector above the roof when the second end of the base contacts the wind deflector proximate the roof, the level indicator indicates that the base has a level orientation, and the displacement indicator is in contact with a top edge of the wind deflector.

2. The system of claim 1, further comprising a standoff to space the arm apart from the base.

3. The system of claim 2 wherein the standoff is integral with the base.

4. The system of claim 2 wherein the standoff is a separate piece attached to the base.

5. The system of claim 1 wherein the arm is adjustably positionable with respect to the longitudinal axis of the base.

6. The system of claim 1 wherein the adjustable stop is a threaded set screw.

7. The system of claim 1 wherein the adjustable stop further comprises a bumper.

8. The system of claim 1 wherein the level indicator is one of a spirit level, inclinometer, mechanical angle indicator and electronic angle indicator.

9. The system of claim 1 wherein the displacement indicator is one of a dial depth gauge and a dial indicator.

10. The system of claim 9 wherein a gauge of the displacement indicator includes one of a digital and analog visual display.

11. The system of claim 9 wherein the displacement indicator further comprises one of a transducer and an encoder.

12. The system of claim 11 wherein the displacement indicator further comprises a data recorder.

13. A method for measuring the height of a wind deflector mounted to the roof of a vehicle, comprising the steps of:
    selecting a base;
    affixing an indicator to the base such that the indicator is spaced apart from base;
    placing an end of the base in contact with the wind deflector proximate the roof such that the indicator contacts a top edge of the wind deflector;
    orienting the base to a level plane; and
    obtaining from the indicator information relating to the height of the wind deflector above the roof.

14. The method of claim 13, further comprising the step of adjusting a stop to orient the base to a level plane.

15. The method of claim 13, further comprising the step of utilizing one of a spirit level, inclinometer, mechanical angle indicator and electronic angle indicator to determine when the base is oriented to a level plane.

16. The method of claim 13, further comprising the step of selecting one of a dial depth gauge and a dial indicator for the indicator.

17. The method of claim 13, further comprising the step of selecting a standoff to space the arm apart from the base.

18. The method of claim 13, further comprising the step of converting the information relating to the height of the wind deflector above the roof to a corresponding electrical signal.

19. The method of claim 18, further comprising the step of recording the information.

20. A system for measuring the height of a wind deflector mounted to the roof of a vehicle, comprising:
    a longitudinal base having a first end, an opposing second end, a generally planar top surface and a generally planar bottom surface;
    an adjustable stop proximate the first end of the base and extending away from the bottom surface;
    a level indicator affixed to the top surface of the base;
    an arm spaced apart from the top surface of the base by a standoff and adjustably positionable with respect to the longitudinal axis of the base; and
    a displacement indicator affixed to the arm,
    wherein the displacement indicator displays information relating to the height of the wind deflector above the roof when the second end of the base contacts the wind deflector proximate the roof, the level indicator indicates that the base has a level orientation, and the displacement indicator is in contact with a top edge of the wind deflector.

* * * * *

UNITED STATES PATENT AND TRADEMARK OFFICE
CERTIFICATE OF CORRECTION

| | |
|---|---|
| PATENT NO. | : 7,356,939 B1 |
| APPLICATION NO. | : 11/735990 |
| DATED | : April 15, 2008 |
| INVENTOR(S) | : Samuel R. McCrary et al. |

It is certified that error appears in the above-identified patent and that said Letters Patent is hereby corrected as shown below:

On the title page, Item (74), "Elay Law Firm Co." should be --Eley Law Firm Co.--.

Signed and Sealed this

Eighth Day of July, 2008

JON W. DUDAS
*Director of the United States Patent and Trademark Office*